Sept. 5, 1944.  F. A. PARISH  2,357,685
IRONER MECHANISM
Original Filed Feb. 20, 1936  3 Sheets-Sheet 1
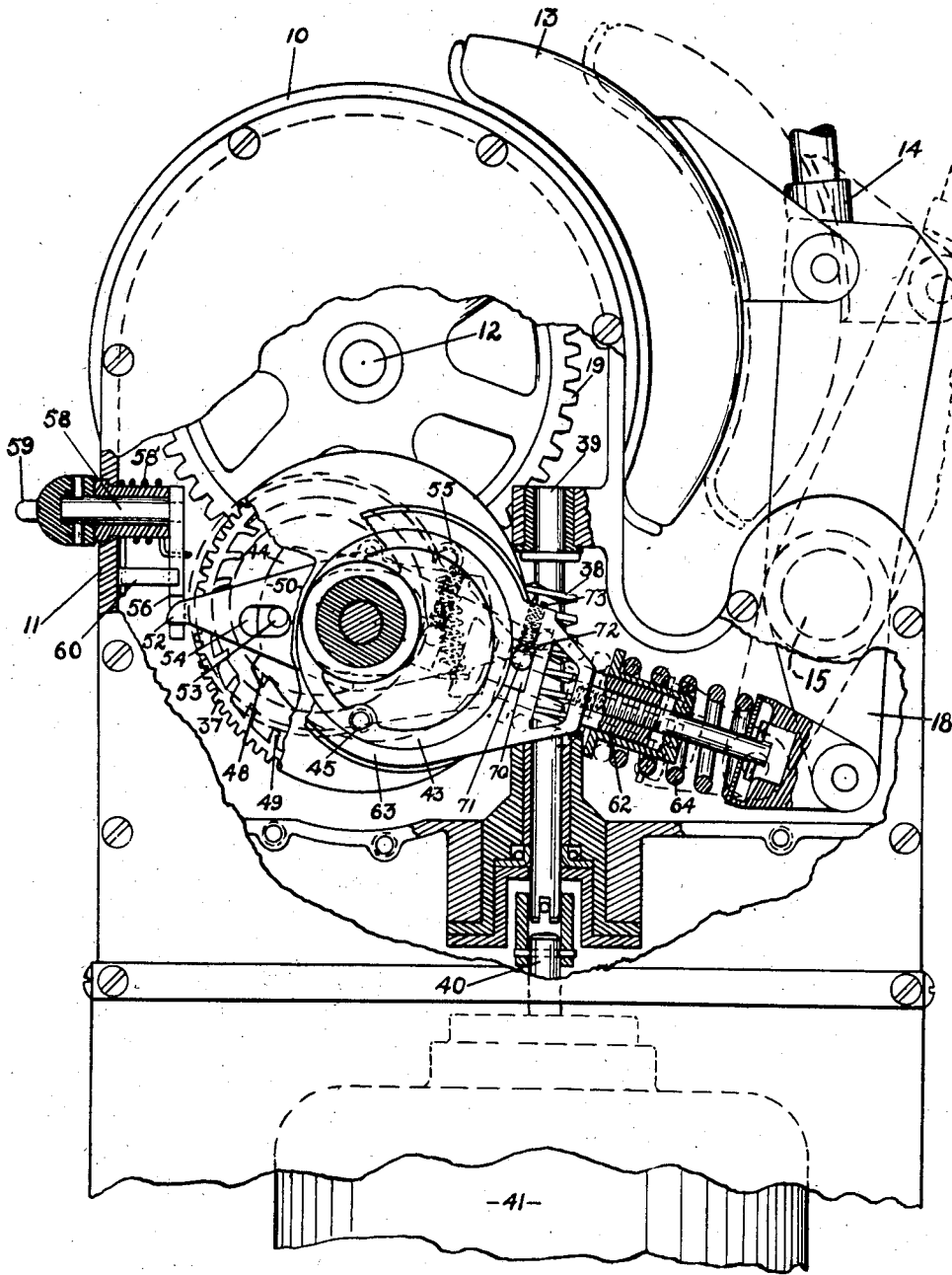
FIG_1
INVENTOR.
BY Fred A. Parish
Tefft & Tefft
ATTORNEYS.

Sept. 5, 1944. F. A. PARISH 2,357,685
IRONER MECHANISM
Original Filed Feb. 20, 1936 3 Sheets-Sheet 2
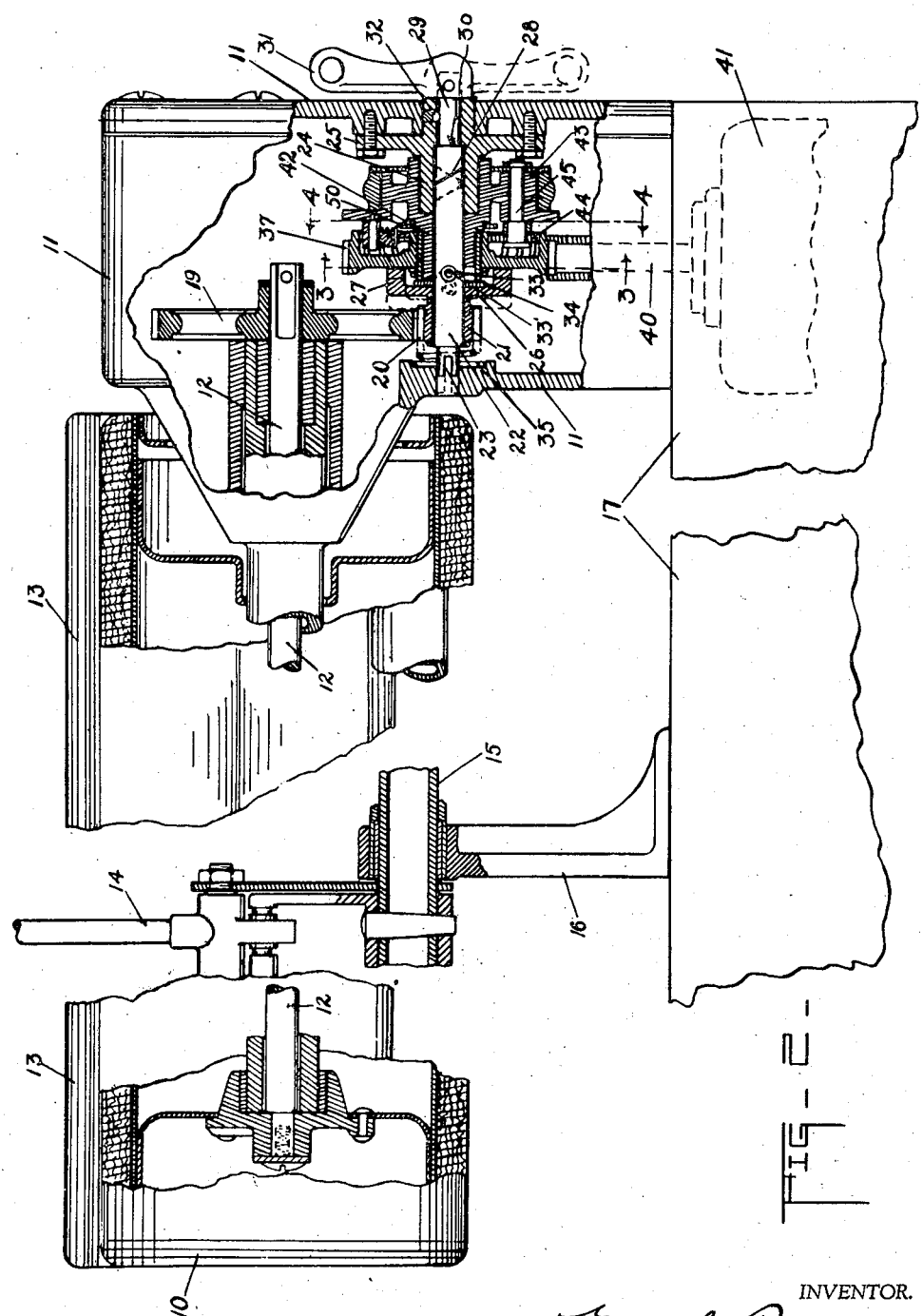
INVENTOR.
BY Fred A. Parish
Tefft & Tifft
ATTORNEYS.

Sept. 5, 1944. F. A. PARISH 2,357,685
IRONER MECHANISM
Original Filed Feb. 20, 1936   3 Sheets-Sheet 3
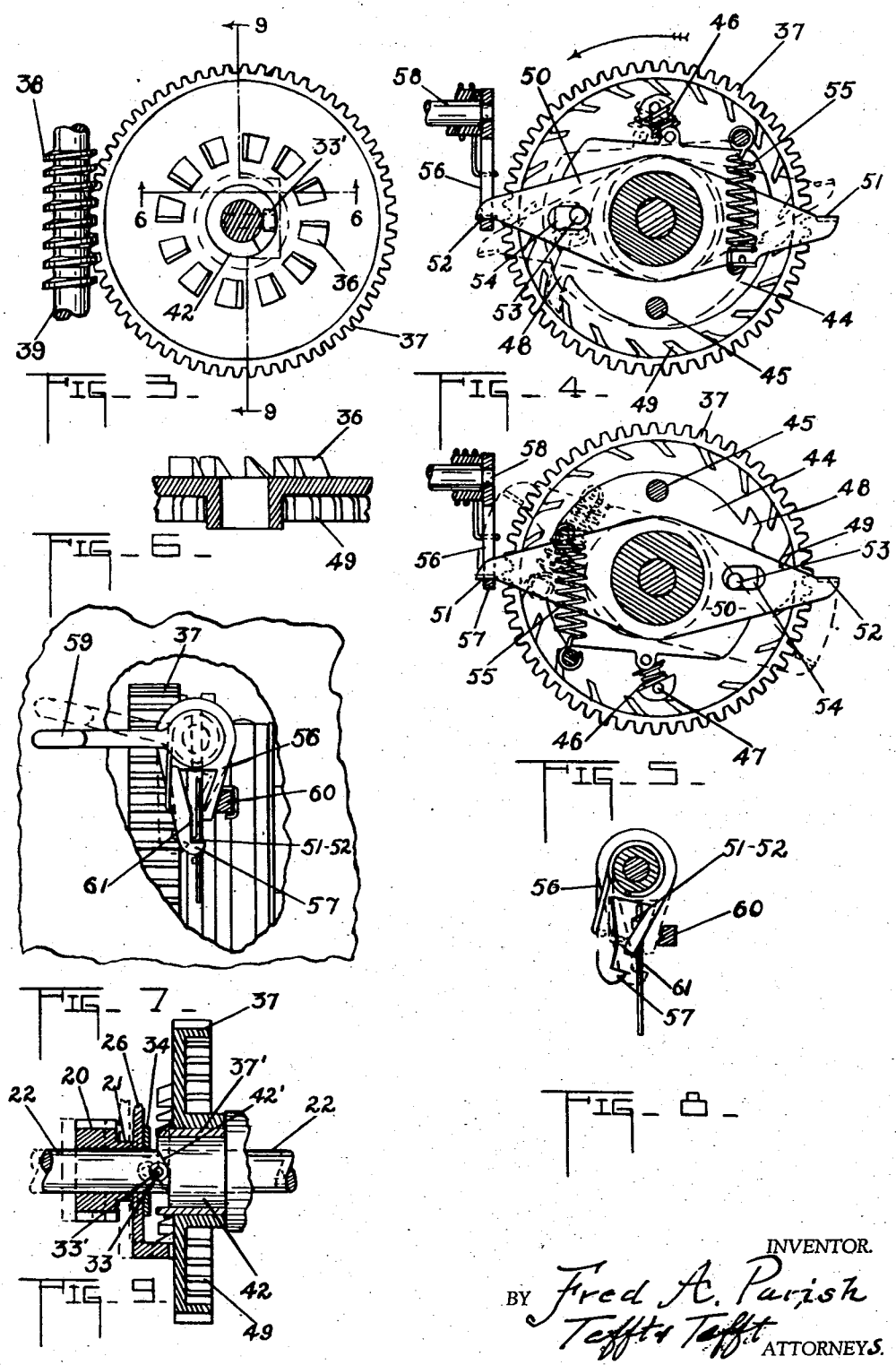

Patented Sept. 5, 1944

2,357,685

UNITED STATES PATENT OFFICE 2,357,685

IRONER MECHANISM

Fred A. Parish, Whittier, Calif., assignor to Automatic Washer Company, Newton, Iowa, a corporation of Delaware Original application February 20, 1936, Serial No. 64,825. Divided and this application October 14, 1939, Serial No. 299,504

3 Claims. (Cl. 38—61)

This invention has reference to the art of making improved and simplified driving mechanism for domestic power driven roll ironing machines and is a division of co-pending application Serial No. 64,825, issued March 12, 1940, as Patent No. 2,193,538.

The particular object of the invention is to provide a driving mechanism for roll ironers, which includes power means for controlling rotation of the ironing roll and for controlling power operation of the ironing shoe.

A further object is to provide a mechanism as aforesaid, in which there is included a manually operated clutch for controlling the roll driving means and an additional manually operated clutch for controlling the shoe operating means.

An additional object is to provide a clutch mechanism controlling the shoe operating means, which clutch mechanism is provided with special means for operating the clutch in and out of engaged position and a device for holding the clutch in either of its operating positions.

Another object is to provide a shoe operating mechanism which includes an eccentric member revolvable in steps through 180 degrees to operate the ironing shoe toward or away from the roll and manually controlled clutch mechanism connecting the eccentric with the power driven elements in such a manner as to operate the eccentric through the aforementioned steps of 100 degrees, and means automatically requiring separate operation of the manual control means for each step of operation of the eccentric.

It is an additional object to provide a clutching mechanism controlling rotation of the ironing roll, manual means controlling the clutch, an additional clutching mechanism controlling operation of the ironing shoe, manual means controlling the latter clutch, and mechanism connecting the ironing shoe mechanism and first mentioned clutch whereby rotation of the roll is controlled responsively to movement of the shoe toward and away from the roll.

Other objects and advantages will be apparent in the following description and accompanying drawings, in which:

Fig. 1 is an end elevational view showing a roll ironer mechanism embodying my invention with certain portions broken away and other portions shown in section to facilitate description;

Fig. 2 is a fragmental side elevational view, with certain portions broken away and other portions shown in section;

Fig. 3 is an enlarged elevational view taken on line 3—3 in Fig. 2;

Fig. 4 is an enlarged elevational view taken on line 4—4 in Fig. 2;

Fig. 5 is a view similar to Fig. 4 showing parts in operated position, as will be explained;

Fig. 6 is a sectional fragmental view taken on line 6—6 in Fig. 3;

Fig. 7 is a fragmental detailed view showing control elements to be described;

Fig. 8 is a detailed view showing parts of the mechanism disclosed in Fig. 7 in operated position; and Fig. 9 is a fragmental sectional elevational view showing details of mechanism to be described.

Ironing machines of the domestic power driven type are well-known and widely distributed, and since my invention may be embodied with many of the well-known types of roll ironers, I will confine myself to a brief description of the ironing shoe and roll mechanisms shown herein. Detailed description is thought unnecessary.

The ironing mechanism comprises a roll 10 rotatably mounted upon a housing structure 11 and connected with the driving mechanism by means of a shaft 12, and means for rotating the shaft and roll to be described shortly. An ironing shoe 13 is mounted by means of an arm mechanism 14 secured to a shaft structure 15, supported in its outboard end by a stand 16, which is affixed to the structure 17, supporting the housing 11. The shaft structure 15 extends within the housing 11 and to its inner end is attached an arm 18, which latter is connected, by means to be described, with my novel shoe and roll driving mechanism. The shaft 12 of roll 10 carries on its inner end a gear 19 which meshes with a pinion 20 carried upon a sleeve structure 21, which latter is rotatably mounted upon a horizontal shaft 22 slidably mounted at the left hand end in a bearing 23 formed in the housing structure 11 and at its right hand end in an inwardly extending boss portion 24 of a bracket fixture 25 secured to the inner side of the outer wall of the housing 11. The shaft is keyed against rotation in bearing 23.

The sleeve structure 21 has a flanged portion 26, which is provided with a series of teeth 27 lying upon its right hand face.

At a point within the boss 24, the shaft 22 is chamfered, as shown at 28, and opposite this chamfered end is a similarly formed end of a shaft 29, which has a shoulder 30 resting upon an annular ledge formed in fixture 25 and extending to a point outside the housing 11. On the extending end of the shaft is a handle member 31.

A ball click device 32, secured in the wall of fixture 25 is adapted to co-act with recesses in shaft 29, the recesses being disposed on the shaft in such position as to hold the same in several adjusted positions.

Shaft 22 carries a pin 33 carrying a roller 33' and a hardened washer 34 is disposed between the roller and the inner face of flange portion 26 of sleeve member 21. A coil spring 35 reacts between the wall structure 11 and sleeve 21 to normally urge the latter toward the right. It will now become apparent that rotation of shaft 29, as by means of handle 31, will bring about a change in the relationship between the angularly disposed contacting faces at 28 so as to bring the high part of shaft 29 into contact with the high part of shaft 22 and thus shaft 22 will be forced toward the left, pressing the pin 33 against the flange of sleeve 21 in opposition to spring 35 whereby sleeve 21 is moved toward the left. Lying opposite and in the path of teeth 27 is a series of cooperative teeth 36 which are carried upon the face of a worm gear member 37. Worm gear 37 is meshed by a worm 38 secured to a vertical shaft 39 which extends downwardly into the housing structure and has driving connection with a shaft 40 of a conventional drive motor 41. The worm gear is mounted for rotation on a sleeve structure 42, there being provided a suitable bushing 37' disposed between the surfaces of the members, as shown.

With motor 41 running the worm gear 37 is constantly rotating and it will be apparent that, by means of manipulation of handle 31, as described, the sleeve structure 21 may be alternately moved back and forth to engage the teeth 27 with the teeth 36 whereby the roll is alternately driven and stopped.

The sleeve structure 42 carries an eccentric member 43. That part of the sleeve structure lying under the eccentric is rotatably supported upon the boss portion 24 of fixture 25 and while supporting worm gear 37, it is itself made rotatable within the gear 37 and upon the shaft 22 and boss portion 24.

Reference will now be had to Figs. 2 to 5, wherein there is shown a rocking member 44 pivotally mounted upon shoulder rivet 45 affixed in offset position in the body of eccentric 43. Member 44 has a disc like form and an enlarged opening at its center by reason of which it may rock upon shoulder rivet 45 without interference with the sleeve 42. On the side opposite shoulder rivet 45 is a spring and link mechanism 46 pivotally mounted at 47 on the eccentric structure. The mechanism 46 is obviously an over-center device which has the function of urging member 44 toward either of its extreme positions and holding it in such position. The parts may lie in the position shown in Fig. 5. Member 44 is provided with a tooth 48 which is movable into or out of engagement with one of a series of inwardly directed teeth 49 lying inside the rim of worm gear 37.

It will be apparent that with the parts lying in position shown in Fig. 5 the mechanism 46 acts to hold member 44 and tooth 48 away from the path of teeth 49, whereas if member 44 is rocked in counterclockwise direction to a point beyond dead center alignment between pivot 47 and shoulder rivet 45, that is, a little more than one-half its stroke, the mechanism 46 will force member 44 to continue the counterclockwise movement until member 44 reaches a stop position which, in this instance, is a position in which the tooth 48 is in firm engagement with one of the teeth 49. The engaged position is shown in dotted lines in Fig. 4.

Rockably mounted upon the sleeve 42 and disposed adjacent member 44 is a member 50 having plural oppositely disposed arms 51 and 52. A stud 53 secured in member 44 loosely engages a slot 54 in member 50. A spring 55 having one end attached to member 50 and the opposite end anchored on the body of eccentric 43 tends to rotate member 50 upon sleeve 42 in counterclockwise direction whereby, through the connection of stud 53, similar rotation is imparted to member 44.

With the arms 51 and 52 left free the mechanism just described will normally lie with teeth 48 and 49 engaged, whereby the rotation of worm gear 37 causes unitary rotation, through connection of the shoulder rivet 45, of the eccentric 43. With parts in this position rotation of eccentric 43 and the entire mechanism will obviously continue until one of arms 51 or 52 is obstructed, whereupon the arm will cease to rotate and rotation of stud 53 will be arrested while at the same time shoulder rivet 45 will continue to rotate. This situation will obviously result in counterclockwise rotation of member 44 on shoulder rivet 45 and the tooth 48 will thus be withdrawn from engagement with the tooth 49, the mechanism 46 assisting the movement.

When the movement has progressed far enough to bring mechanism 46 into action the member 44 obviously completes its stroke to withdraw the tooth 48 out of the path of the teeth 49.

With the arms obstructed, as noted, the entire mechanism, including eccentric 43, will obviously remain stationary.

In view of the foregoing it will be clear that member 50 is a control member which performs its function through being freed or stopped to engage or disengage the clutch elements and thus cause intermittent rotation of eccentric 43.

To control the member 50 I provide an arm 56 having a hook portion 57 which lies in the path of the ends of arms 51 and 52, as shown.

Arm 56 is secured to a shaft 58 which, as shown in Fig. 1, is journalled in a bushing secured in the wall housing 11. A handle 59 is secured to the outer end of the shaft, and a spring 58' urges the arm 56 to rotate in counterclockwise direction so as to normally hold the hook 57 in the path of arm 51 or 52, see Fig. 7. Rotation of arm 56 beyond the desired point is limited by a stop 60 and thus the parts are normally held in the solid line position, shown in Fig. 7. It is thought apparent that with the parts lying in the latter position one of the arms, 51 or 52, is normally held stationary and thus the eccentric 43 is held stationary in one of two positions, which lie 180 degrees apart.

With the worm gear 37 in rotation and the eccentric stationary, handle 59 may be rotated in clockwise direction, as shown in dotted outline in Fig. 7, to withdraw hook 57 from the path of one of the arms 51 or 52, whereupon the mechanism will operate as described to rotate the eccentric. If after the hook 57 has been withdrawn to permit escapement of, for instance, arm 51 and is immediately returned to its obstructing position it will be in the path of the oncoming arm 52, which will eventually engage it and thus the mechanism will have revolved to a stop at 180 degrees. Repetition of the movement of handle 59 just described will obviously result in another step of movement of the mechanism to 180 degrees. Thus, the movement of eccentric 43 may be controlled by means of single momentary manipulation of handle 59.

In practical use it may be possible that an operator moving the handle 59 may fail to allow it to return to obstructing position within the time required for the oncoming arm to reach the hook and thus the arm will pass by without being stopped and the eccentric will be rotated through 360 degrees. As will appear later, the normal functioning of the eccentric depends upon its movement through only 180 degrees and for this reason it is desirable to provide against the possibility of movement of any greater extent. In order to insure the escapement of only one arm as a result of only one manipulation of handle 59, I provide a novel means for forcibly returning hook 57 to obstructing position regardless of the operator's movement.

To accomplish this I arrange a slotted opening in member 56 into which the arms 51 and 52 enter during movement toward the hook. As shown in Figs. 7 and 8 the slot is enlarged at the top and gradually contracts to a throat 61 through which the arm must pass before reaching hook 57, and in passing through this throat the arm obviously forces the member 56 into aligned position so that the hook 57 lies in the path of the arm. Fig. 8 illustrates the action. Thus, it is made impossible for an operator, with any one manipulation, to permit rotation of eccentric 43 through more than 180 degrees.

The function of eccentric 43 may now be described:

The arm 18 mounted upon shaft 15 has already been noted. Operation of the latter arm from solid to dotted line position in Fig. 1 obviously causes operation of the arm 14 to move the shoe 13 toward or away from the roll 10.

The arm 18 is connected, through a conventional resilient spring linkage mechanism 62 with the eccentric 43 by means of a band member 63. Connecting mechanisms of this type are thought sufficiently conventional to obviate detailed description herein further than to say that when the eccentric lies with its high side toward the arm 18, the arm is moved backwardly, shoe 13 is moved toward and into contact with the ironing roll and is held in resilient pressure relation therewith by means of the spring 64 being placed in compression, whereby irregularities in the thickness of garments lying between roll 10 and shoe 13 are compensated and the pressure of the shoe on the garments is substantially constant. The position of the eccentric shown in Fig. 1 corresponds to, for example, the position of arms 51 and 52 in Fig. 5. In the event of manipulation of handle 59, permitting arm 52 to escape, as described, the eccentric 43 will obviously be rotated 180 degrees which will place its high side away from arm 18, thus rotating the arm toward the eccentric and moving shoe 13 away from the roll. In the latter position of the eccentric the arm 52 will obviously be in contact with hook 57, as shown in Fig. 4.

As will be apparent, during operation of the mechanism just described, when either of arms 51 or 52 is obstructed to effect disengagement of tooth 48, the spring 55 is placed under tension. As has already been described, the spring has one end anchored to eccentric 43, and when the mechanism is stopped, as in Fig. 1, the spring would tend to rotate the eccentric in counterclockwise direction. This tendency, in the presence of the slight disturbance usually resulting from normal operation of the associated mechanism, is likely to result in back-slip movement of the eccentric, which movement would eventually result in re-engagement of tooth 48 whereupon the eccentric would be re-rotated to original position, to begin another cycle of back-slip movement.

Such performance would obviously be unsatisfactory and to avoid it I provide a mechanism capable of locking the eccentric against back-slip movement as follows:

In the base portion of the eccentric band structure is an aperture 70, one side of which is open to the face of the eccentric. Between the face of the eccentric and the back wall of the aperture is a floating roller 71, urged downwardy by a spring 72 disposed in an aperture in the base structure and backed by a screw 73.

The back wall of aperture 70 is so disposed with reference to the face of the eccentric that roller 71 rests in wedging relationship between them.

It will be obvious that the roller forms a locking element which, through its wedging action, effectively locks the eccentric against back slip rotation.

Attention is now directed to Figs. 3 and 9 in which it is shown that a portion of the left hand face of the sleeve structure 42 is cut away so as to provide faces at two levels, there being an inclined surface 42' leading from the lower to the higher face.

The faces are so arranged with reference to eccentric 43 that when the eccentric is positioned to place the ironing shoe in contact with the roll, the low face lies under roller 33' and the roller, together with shaft 22, is held so as to position the roll clutch elements in driving engagement whereas when the eccentric is positioned to hold the shoe away from the roll, the high face lies under the roller and shaft 22, together with clutch elements 27, are shifted out of driving engagement as indicated in dotted lines in Fig. 9.

It will be readily apparent that successive manipulations of handle 59 will result in alternately placing eccentric 43 in the positions noted, whereby shoe 13 is operated toward and away from the roll 10.

In view of the foregoing, it will be clear that in practical operation of the ironer, the handle 59, by reason of its control of eccentric 43, is adapted to control rotation of the roll, whereby when it is operated to move the shoe away from the roll the roll is automatically stopped, and when operated to move the shoe into contact with the roll, the roll is automatically started. Such operation is useful in ordinary ironing activity.

When the handle 31 is operated to render the roll stationary, as has been described, the shoe may obviously be operated toward or away from the stationary roll by means of the handle 59. Such operation is useful in the work of pressing garments and materials.

The utility of the slot arrangement including the throat 61 above described, will now become apparent.

Under conditions of practical use the speed of rotation of worm gear 37 is substantially rapid and when handle 59 is manipulated the eccentric and shoe are quite rapidly operated to their new positions. Without the throat 61 it would be quite easy for an operator to forgetfully hold the handle 59 in open position for a short period of time, and if it is held in this position for sufficient time to permit the passage of the opposite arm, the eccentric will obviously make a complete revolution and thus the shoe is likely to be moved through a cycle over into contact with the roller and back to its original position. Such operation will obviously be undesirable. There may be times when the operation is unexpected and the operator's fingers might be placed in danger. Such a situation might arise, for instance, when the shoe is being held against the roll and a normal ironing or pressing operation is in progress. The operator, wishing to move the shoe away from the roll, would manipulate handle 59 and while at the same time one hand may be on the roll and very close to the shoe. The operator, assuming that his manipulation of handle 59 would result in movement of the shoe away from the roll might permit the fingers to come under the shoe whereupon in case he did not return the hook 57 quickly enough the shoe would immediately return to the roll and might contact the operator's fingers.

In normal use the operator controls the movement of the shoe and roll entirely by control handle 59. With the shoe away from the roll and roll stationary, she places the work on the roll and depresses the handle 59, thereupon the shoe moves into pressure contact with the roll and the roll rotates. By again depressing the handle 59, the shoe moves away from the roll and the roll stops rotating. By actuating the lever 31 all rotation of the roll is stopped and thereupon when the operator depresses the handle 59, the shoe merely moves into pressure contact with the stationary roll. By again depressing the lever 59, the shoe is removed from the stationary roll. This type of operation is used for pressing.

The foregoing has described an ironer mechanism embodying my invention. Modifications of structure are obviously possible without alteration of the principle disclosed. I do not wish to be limited in structure or function, except within the scope of the appended claims.

I claim:

1. In an ironer drive mechanism having a roll and a shoe, mechanism for rotating the roll and for moving the shoe into and out of pressure engagement with the roll, said mechanism comprising a support shaft, a rotatable eccentric journaled on said shaft for moving the shoe, a main drive gear journaled on said shaft adjacent the eccentric, said main drive gear having a surrounding rim with inwardly projecting clutch teeth on said rim, a clutch member housed within said rim, means connecting said clutch member with the eccentric for rotation therewith and for movement relative thereto, said clutch member having a peripheral tooth for clutch engagement with the rim clutch teeth to connect the eccentric with the drive gear, a rocking member journaled on said shaft and having operative connection with the clutch member for moving said clutch member into and out of clutch engagement with the main drive gear, said rocking member having oppositely disposed arms for rocking movement with said rocking member, a catch having spaced sides forming a throat therebetween adapted to receive the rocking arms therein, one of said spaced sides having a shoulder thereon extending transversely of the throat in the path of the arms to hold said arms against rocking movement, the opposite side being shortened to provide a side outlet for the arm upon longitudinal movement thereof and means mounting said catch for swinging movement of said shoulder thereof transversely into and out of the path of rocking movement of the arms.

2. In an ironer drive mechanism, the combination of a roll and a shoe, and mechanism for rotating the roll and for moving the shoe into and out of pressure engagement with the roll, said mechanism comprising a support shaft, a main drive gear mounted on said support shaft, drive means for moving the shoe toward and from the roll, station mechanism for connecting said drive gear with the drive means, said station mechanism including a control member rotatable therewith, said control member having oppositely disposed arms, a holding member having spaced sides forming a throat therebetween, means mounting said holding member to position the spaced sides on opposite sides of the plane of movement of the control member arms and for swinging movement laterally relative thereto, one of said spaced sides having a shoulder thereon extending transversely of the throat in position to engage one of the arms in one position of said holding member, said holding member having a lateral opening between said shoulder and the opposed side for releasing the arm from the shoulder therethrough upon swinging movement of the control member.

3. In an ironer drive mechanism, the combination of a roll and a shoe, and mechanism for rotating the roll and for moving the shoe into and out of pressure engagement with the roll, said mechanism comprising a longitudinally shiftable support shaft, a main drive gear mounted on said support shaft, drive means for moving the shoe toward and from the roll, station mechanism for connecting said drive gear with the drive means, said station mechanism including a control member rotatable therewith, said control member having oppositely disposed arms, a holding member having spaced sides forming a throat therebetween, means mounting said holding member to position the spaced sides on opposite sides of the plane of movement of the control member arms and for swinging movement laterally relative thereto, one of said spaced sides having a shoulder thereon extending transversely of the throat in position to engage one of the arms in one position of said holding member, said holding member having a lateral opening between said shoulder and the opposed side for releasing the arm upon longitudinal shifting of the support shaft from the shoulder therethrough upon swinging movement of the control member.

F. A. PARISH.